(12) United States Patent
Dyer

(10) Patent No.: US 7,067,210 B2
(45) Date of Patent: Jun. 27, 2006

(54) FUEL CELL SYSTEM FOR PRODUCING ELECTRICAL ENERGY

(76) Inventor: Christopher K. Dyer, 16 Seven Oaks Cir., Madison, NJ (US) 07940-1314

(*) Notice: Subject to any disclaimer, the term of this patent is extended or adjusted under 35 U.S.C. 154(b) by 0 days.

(21) Appl. No.: 11/054,498

(22) Filed: Feb. 9, 2005

(65) Prior Publication Data
US 2005/0136300 A1 Jun. 23, 2005

Related U.S. Application Data

(62) Division of application No. 10/273,280, filed on Oct. 17, 2002, now Pat. No. 6,864,002.

(60) Provisional application No. 60/330,275, filed on Oct. 19, 2001.

(51) Int. Cl.
*H01M 8/18* (2006.01)
(52) U.S. Cl. .............................. 429/19; 429/22; 429/34
(58) Field of Classification Search .................. 429/34, 429/17, 19, 22, 38, 39
See application file for complete search history.

(56) References Cited

U.S. PATENT DOCUMENTS 6,461,766 B1 * 10/2002 Young et al. ............. 429/218.2
6,592,741 B1 * 7/2003 Nakanishi et al. .......... 205/343

* cited by examiner

*Primary Examiner*—Bruce F. Bell
(74) *Attorney, Agent, or Firm*—Adams & Wilks

(57) ABSTRACT

A fuel cell system has a fuel cell disposed within a fuel cell enclosure for electrochemically combining externally supplied oxygen with hydrogen to produce direct-current electrical energy and water as a reaction product. A hydrogen-containing fuel such as a chemical hydride contained within a fuel container receives the by-product water and reacts therewith to produce hydrogen, which is supplied to the fuel cell to sustain operation thereof without need of adding externally supplied hydrogen. The integration of the supply of hydrogen with the fuel cell results in a weight and volume reduction as well as internal chemical control of the production of hydrogen to sustain the electrical power generation and internal water management whereby liquid water emission is substantially reduced.

28 Claims, 2 Drawing Sheets

* Oxygen depleted Air

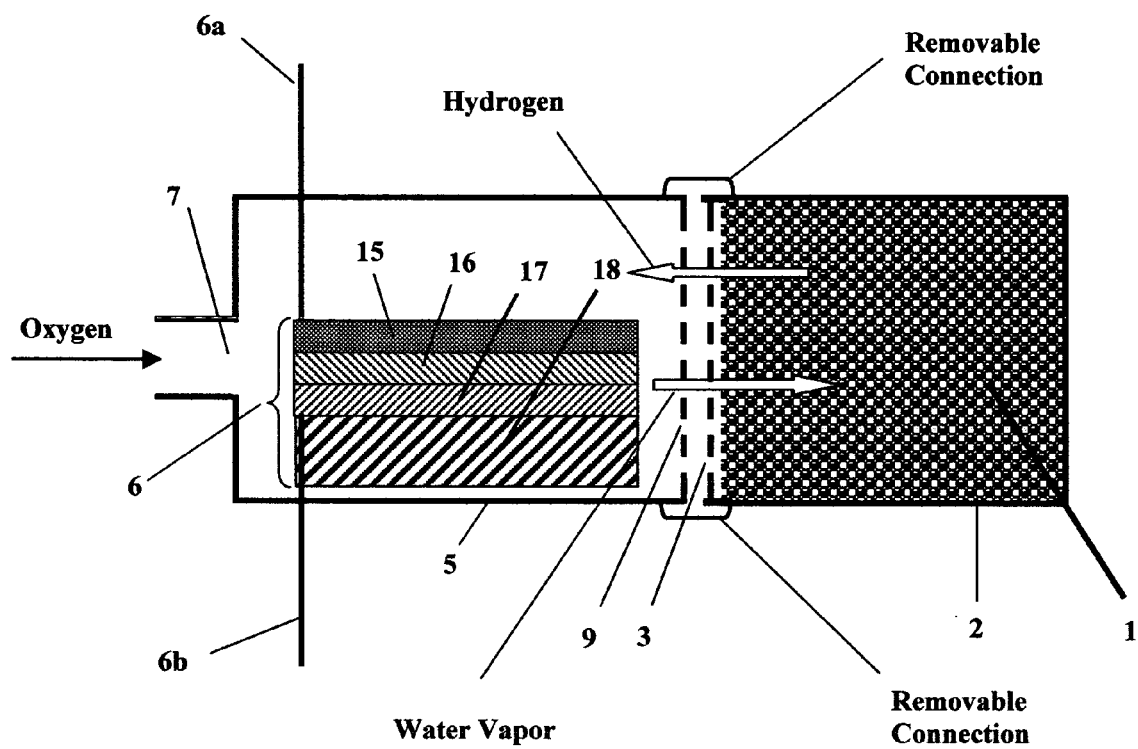

FUEL CELL SYSTEM FOR PRODUCING ELECTRICAL ENERGY

CROSS REFERENCE TO RELATED APPLICATIONS

This application is a division of application Ser. No. 10/273,280 filed Oct. 17, 2002 now U.S. Pat. No. 6,864,022, which claims the benefit of U.S. Provisional Application No. 60/330,275 filed Oct. 19, 2001, and priority thereto for common subject matter is hereby claimed.

BACKGROUND OF THE INVENTION

The present invention relates generally to fuel cells, and more particularly, to fuel cells that consume gaseous hydrogen-containing fuels and produce electrical energy and water.

Typically, such a fuel cell generates water in the normal course of power generation using oxygen in the air to electrochemically combine with hydrogen gas to produce electrical energy by well-known electrochemical principles. Advantageous fuel cells for energy conversion are described in my U.S. Pat. Nos. 4,863,813; Re34,248; 4,988,582 and 5,094,928. In a fuel cell of the type described therein, a hydrogen-containing material at room temperature, such as a gaseous mixture of hydrogen and oxygen, is directly converted to direct-current electrical energy and the only reaction product is water.

In one such specific illustrative fuel cell, a submicrometer-thick gas permeable ionically conducting electrolytic membrane made of pseudoboehmite is deposited on an electrode that comprises a platinized impermeable substrate. A layer of platinum, for example, is deposited on the top surface of the membrane to form the other electrode of the fuel cell, which electrode is porous enough to allow the gas mixture to pass into the membrane. In a hydrogen/air mixture, such a fuel cell provides useful current at an output voltage as large as about one volt. While the voltage and current provided by the basic fuel cell are adequate for many applications of practical interest, I recognized that it would be desirable to devise a compact source of hydrogen for this and other fuel cells especially for portable electronic device applications, such as laptop computers and mobile phones. A suitable combination of a fuel cell with a lightweight, low volume source of hydrogen, could provide an improved source of power for portable electronic applications compared with batteries.

Several chemical hydride materials, with a high hydrogen content, react with water to yield hydrogen. The combined weight and volume of a chemical hydride and the water necessary to react with it to make hydrogen for use in a fuel cell, is termed the "specific energy" content of the fuel, which is normally measured in terms of Watt-hours (energy content) divided by the weight or volume of the chemical hydride plus its needed reactant water. Hence Watt-hours per kilogram or Watt-hours per liter are examples of the specific energy of a fuel for a fuel cell. In a portable application, a fuel cell with its fuel, termed a fuel cell system, would benefit from the use of a high specific energy fuel which would thereby reduce the carrying weight and volume of the fuel cell system.

I recognized that since a fuel cell produces water as a by-product during the normal course of its power-generating operation, a fuel cell that can use this by-product water as the reactant with a chemical hydride fuel would be advantageous in raising the specific energy of a fuel cell system by eliminating the need to carry additional water. Only one reactant, the chemical hydride, would then need to be carried in the fuel cell system. I recognized that fuel cells that could tolerate air mixed with their fuel supply would particularly benefit from such a method of generating hydrogen. I also recognized that a chemical means of control of the rate of hydrogen generation in such a fuel cell system would be advantageous. I further recognized that a portable fuel cell system would benefit from a means to collect the water produced during normal production of electrical energy to avoid wetness and flooding in the vicinity of the operating fuel cell.

SUMMARY OF THE INVENTION

The present invention implements operation of a fuel cell with hydrogen fuel derived from the reaction of a chemical fuel, such as a chemical hydride, with the by-product water from the fuel cell. Integration of this fueling means with a suitable fuel cell constitutes a device, termed a fuel cell system, which is characterized in that it only requires an external supply of oxygen or air and has a higher specific energy density than a fuel cell system that requires a separate or additional source of water. By internally utilizing the fuel cell's own water output, the present invention improves the performance, control and safety of a fuel cell system in which a fuel cell is coupled to the fuel supply consistent with the principles of the invention. The improved performance of the device is characterized by a higher specific energy content, as measured by weight and volume. This improvement is achieved by elimination of the need to include additional water for reaction with a chemical hydride to produce hydrogen.

An additional advantage of the present invention is that it controls the rate of hydrogen generation by controlling the water supply to the chemical hydride. The water supply available for reaction with the chemical fuel containing hydrogen is controlled by the electrical energy demanded. In the present invention, a fuel cell that produces water vapor during the course of its operation is coupled to a suitable chemical hydride, which is defined as a hydrogen-containing fuel that reacts with water vapor to produce hydrogen gas under the same ambient conditions as the fuel cell and does not need a separate source of water other than supplied by the fuel cell. In the present invention, the water vapor from the fuel cell exhaust is directed towards a container containing the suitable chemical hydride material where it reacts to form hydrogen, which is then delivered to the anode of a fuel cell to sustain the electrical energy production.

Typical fuel cells, however, produce water at the cathode or positive electrode which is mixed with air and so the product after reaction of this typical fuel cell exhaust with a chemical hydride would contain both hydrogen and air. In these typical fuel cell designs, the fuel is required to be mostly uncontaminated with air. Therefore if the fuel cell requires hydrogen mostly unmixed with air at its anode or negative electrode, an additional means to separate the water vapor from the air or the hydrogen from the air would be advantageous, so that only hydrogen mostly unmixed with air is supplied to the fuel cell anode.

Advantageously, a fuel cell which not only produces water vapor but also requires a mixture of air and hydrogen to generate electrical energy, would especially benefit from the present invention since no separation of water from air or hydrogen from air would be required to operate such a fuel cell. Examples of such a fuel cell are described in my U.S. Pat. Nos. 4,863,813; Re34,248; 4,988,582 and 5,094, 928. This fuel cell combined with the present invention would constitute a preferred embodiment. Another fuel cell that would advantageously benefit from the present invention would be a fuel cell that produces water unmixed with air, for instance a fuel cell which produces water at the anode, or negative electrode side of the cell, where it is accompanied by mostly hydrogen, an example being the solid oxide fuel cell.

Since a fuel cell produces by-product water in direct proportion to the amount of electrical energy produced, the supply of water in the present invention is regulated by the electrical energy demand. In the present invention, the chemical fuel such as a chemical hydride is preferably chosen to require the same amount of reactant water as the fuel cell produces to sustain the fuel cell operation. This then prevents excessive and wasteful production of hydrogen and thereby acts as a control, which is advantageous to both conservation of the remaining chemical hydride material and to safety. The chemical hydride is also preferably selected on the basis that the supply of water by the fuel cell is sufficient to react all of the chemical hydride. For a given amount of electrical energy produced, the rate of production of hydrogen needed for use in a fuel cell is exactly balanced by the amount of water it produces when using a preferable chemical hydride. As the electrical energy demand is increased, more current is produced accompanied by more water production, which on reaction with the chemical hydride leads to more hydrogen production to sustain the higher electrical energy demand. As the demand for electrical energy is reduced to zero, the amount of water produced is correspondingly reduced to zero and as a consequence, the amount of hydrogen is also reduced to zero, which provides a safe method of storing and transporting hydrogen. Thereby, the present invention advantageously provides a means of efficient and safe control of the amount of hydrogen produced.

Another advantage of the present invention would be the use of a solid hydrogen-containing fuel that effectively absorbs product water from the fuel cell, thereby avoiding wetness and flooding in the vicinity of the outlet from an operating fuel cell. Several inorganic chemical hydrides react with water vapor to give hydrogen and also produce a solid product, which is a beneficial method of "water management" in the present invention. Further attendant benefits characterize the present invention since it provides a means of measuring the remaining energy content of the fuel. For fuel cells using the present invention, the production of hydrogen may be accompanied by a weight and volume gain within the chemical hydride container. Such physical changes could be monitored by simple gravimetric or volumetric means to provide a measure of the extent of reaction undergone by the chemical hydride and therefore the remaining energy content of the system.

The foregoing as well as other objects, features and advantages of the present invention will become readily apparent to those of ordinary skill in the art upon a reading of the following detailed description of the invention when read in conjunction with the accompanying drawings.

BRIEF DESCRIPTION OF THE DRAWINGS

FIG. 3 is a simplified diagrammatic representation of another embodiment of a fuel cell system according to the principles of the present invention.

DETAILED DESCRIPTION OF THE INVENTION

Fuel Cell Integrated with Fuel Supply

Figure 1:
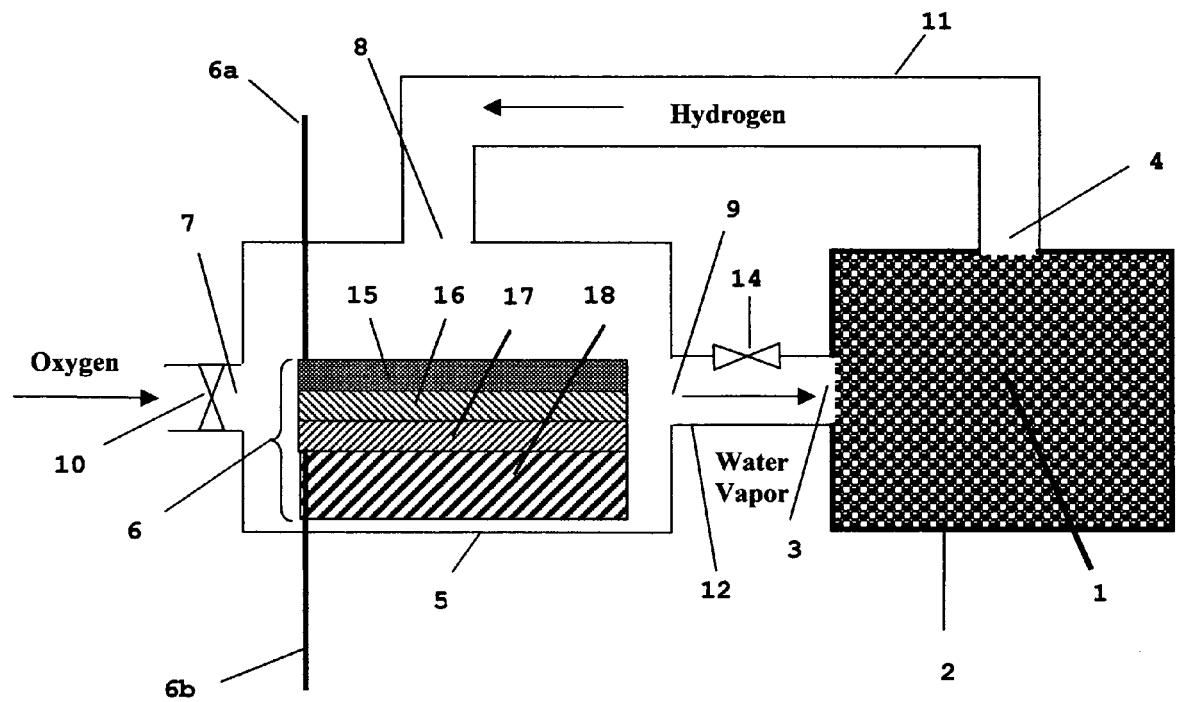
FIG. 1 is a simplified diagrammatic representation of one embodiment of a fuel cell system according to the principles of the present invention.

An illustrative example of a fuel cell system according to the present invention is shown in FIG. 1. The fuel cell system comprises a hydrogen-containing fuel 1 such as, for example, a $NaBH_4$ chemical hydride fuel, housed within a fuel container 2. The fuel container 2 has an inlet 3 for admitting water principally in the form of water vapor into the container 2 for reaction with the hydrogen-containing fuel 1 to produce hydrogen gas which exits the container 1 through an outlet 4.

A fuel cell enclosure 5 has disposed therein a fuel cell 6 which may, for example, be of the type described in my U.S. Pat. Nos. 4,863,813; Re43,248; 4,988,582 and 5,094,928, the entire disclosures of which constitute part of the disclosure of the present application and are hereby incorporated by reference herein. An example of one such fuel cell 6 is shown diagrammatically in FIG. 1 and comprises a mixed-gas fuel cell having an impermeable substrate 18, an impermeable or permeable catalytic electrode 17, a permeable ion-conducting electron-insulating electrolytic membrane 16 (referred to as a solid electrolyte body in my earlier patents) and a permeable catalytic electrode 15. The catalytic electrodes 15 and 17 and the membrane 16 are typically thin in accordance with the prior said disclosures from which the term thin film fuel cell used in conjunction with these disclosures derives. By contrast, the substrate 18 is typically relatively thick when compared with the thin film fuel cell since it acts as a mechanical support for the thin film fuel cell. Substrate 18 may usefully also be electronically conductive. The fuel cell 6 is provided with a pair of lead wires 6a,6b for extracting the electrical energy produced by the fuel cell, and the lead wires 6a,6b are connected to fuel cell electrodes in a manner known in the art. The fuel cell enclosure 5 is provided with an oxygen inlet 7 for introducing oxygen into the enclosure, a hydrogen inlet 8 for introducing hydrogen gas into the enclosure, and a water outlet 9 for discharging water from the enclosure. An inlet valve 10 is preferably provided at the oxygen inlet 7 for controlling the inflow of oxygen gas.

In the embodiment shown in FIG. 1, the outlet 4 of the fuel container 2 is directly connected to the hydrogen inlet 8 of the enclosure 5 by a passage such as a conduit 11. In this manner, the interior of the fuel container 2 communicates with the interior of the fuel cell enclosure 5 so that hydrogen gas produced by the fuel 1 discharges through the outlet 4 and is directed through the conduit 11 and the hydrogen inlet 8 into the fuel cell enclosure 5. In this embodiment, another passage such as a conduit 12 communicates the water outlet 9 of the fuel cell enclosure 5 with the inlet 3 of the fuel container 2. This enables water produced during operation of the fuel cell 6 to be admitted into the fuel container 2 for reaction with the hydrogen-containing fuel 1. If necessary, a venting valve 14 may be provided along the conduit 12.

In operation, oxygen or air is admitted through the inlet valve 10 (which is in the open position) and the oxygen inlet 7 into the fuel cell enclosure 5 and mixes with hydrogen admitted through the hydrogen inlet 8 to form the gas mixture needed for the fuel cell 6 to generate electrical energy which passes along the lead wires 6a,6b attached to the fuel cell electrodes. A corresponding amount of water vapor is generated by the fuel cell 6 and is discharged from the fuel cell enclosure 5 through the water outlet 9 and passes through the conduit 12 to the hydrogen-containing fuel 1 via the inlet 3. The water vapor reacts with the hydrogen-containing fuel 1 in the fuel container 2, and results in more hydrogen being passed to the fuel cell 6 to sustain the electrical energy generation.

While the primary purposes of the inlets 7 and 8 and outlet 9 are to allow passage of the primary fuel cell reactants oxygen and hydrogen and the product water, respectively, in practice other gases may accompany the primary reactants and product water. For instance, in addition to water, gases not reacted by the fuel cell 6 including unreacted oxygen and hydrogen may pass through the outlet 9 and then pass unreacted through the fuel 1, container 2, outlet 4 conduit 11 and inlet 8 to the enclosure 5. If air is used as the source of oxygen, nitrogen will also pass unreacted through the elements of the fuel cell system shown in FIG. 1 and further illustrated in FIG. 2. Such air will subsequently become oxygen depleted as a result of normal fuel cell operation.

To maintain a directed flow pattern, oxygen or air may be forced into the fuel cell enclosure 5 through the oxygen inlet 7 with the inlet valve 10 open. This may be achieved by using some of the electrical energy produced by the fuel cell 6. The venting valve 14 may need to be incorporated to allow oxygen-depleted air from the fuel cell container 2 to be removed and replaced by oxygen-rich air through the oxygen inlet 7.

In the embodiment shown in FIG. 3, the valves 10 and 14 together with the outlet 4, the inlet 8 and the conduits 11 and 12 are eliminated, and the fuel cell enclosure 5 is directly connected to the fuel container 2. One or more openings (such as the outlet 9) provided in the fuel cell enclosure 5 are aligned with one or more similar openings (such as the inlet 3) provided in the fuel container 2 so that air diffusing through the oxygen inlet 7 mixes with hydrogen diffusing from the fuel container 2 to provide the mixed gas environment required for power generation by the fuel cell 6, and water vapor diffusing from the fuel cell enclosure 5 enters the fuel container 2 for reaction with the hydrogen-containing fuel 1. This embodiment would allow a simpler design and would generate lower levels of power and be suitable for low powered portable equipment such as a cellphone. Higher levels of power, such as may be required during cellphone transmission, would be supplied by an energy storage device such as a small battery, kept constantly charged by the low power fuel cell system.

In accordance with another aspect of the present invention, the fuel container 2 is removably connected in the fuel cell system so that it can be removed and replaced by a new fuel container. For this purpose, any suitable removable connection may be employed, such as, for example, threaded connections or bolted flange connections, to removably connect the inlet 3 and the outlet 4 of the fuel container 2 to the conduits 11 and 12. In the embodiment shown in FIG. 3, the outlet 4, the inlet 8 and the conduits 11 and 12 are dispensed with, and the fuel container 2 is removably connected directly to the fuel cell enclosure 5 so that the outlet 9 of the fuel cell enclosure 5 communicates directly with the inlet 3 of the fuel container 2 through a series of aligned openings. Alternatively, the conduit 12 could be retained, in which case only the inlet 3 of the fuel container 2 need be removably connected to the conduit 12. In this manner, a spent fuel container 2 may be removed and replaced with a fresh fuel container.

Figure 2:
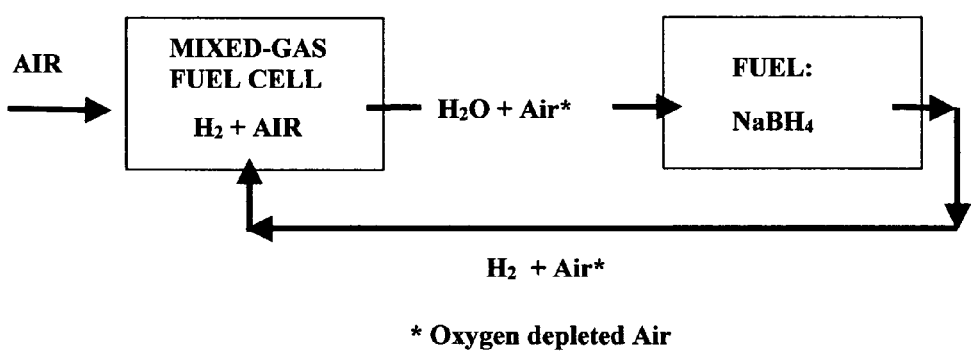
FIG. 2 is an explanatory diagram showing the reactions that take place using air as the source of oxygen during operation of the fuel cell system shown in FIG. 1.

The sequence of reactions involved in the fuel cell system of FIG. 1 are shown as a gas flow chart in FIG. 2:

At the fuel cell 6: $4H_2+2O_2$ (air)=>$4H_2O$ (+electrical energy)

In the fuel container 2: $NaBH_4+4H_2O$=>$4H_2+NaOH.B(OH)_3$

Overall Reaction: $NaBH_4+2O_2$ (air)=>$NaOH.B(OH)_3$

The overall reaction shows that the fuel cell system shown in FIG. 1 produces electrical energy from only one external reactant (oxygen), which is readily available in air, and that no excess hydrogen is produced other than is needed internally for electrical energy production. The reaction also shows that the amount of water produced by the fuel cell is sufficient to react all of the chemical hydride material. An internal cycle of water and hydrogen production is directly controlled and regulated by the external demand for electrical energy which makes the system inherently safe. This cycle may be characterized as follows: For a given amount of electrical energy produced, the rate of production of hydrogen needed for use in a fuel cell is exactly balanced by the amount of water it produces when using suitable chemical hydrides. As the demand for electrical energy is increased, more current is produced accompanied by more water production, which leads to more hydrogen production to sustain the higher electrical energy demand. As the demand for electrical energy is reduced to zero, the amount of water produced is correspondingly reduced to zero and as a consequence the amount of hydrogen is also reduced to zero, which makes the system safe for storing and transporting hydrogen with the inlet valve 10 closed.

A fuel cell capable of producing electrical power on exposure to a mixture of air and 2–4% hydrogen, such as described in U.S. Pat. Nos. 4,863,813; Re43,248; 4,988,582 and 5,094,928, would particularly benefit from the present invention since the carrying capacity of air for water vapor is in the same range, namely 2–4% for the temperature range 20–30° C. This particular benefit arises because in the exemplary reactions shown above, reaction of a given number of water molecules with the chemical hydride produces the same number of molecules of hydrogen thus providing a natural control of the amount of hydrogen generated to the range 2–4% which is generally considered to be a safe level of hydrogen in air, which would be especially beneficial for use in the portable electronic device applications envisaged such as mobile phones and laptop computers. In addition, the supply of water as vapor is an advantageous means to utilize most efficiently the chemical hydride fuel.

The inlet valve 10 prevents uncontrolled access of air or oxygen to the fuel cell system when not in use as shown in FIG. 1. The inlet valve 10 would typically comprise a shut-off valve, mechanically or electrically activated when the fuel cell 6 was no longer delivering power. The venting valve 14 would also be closed when the fuel cell 6 was not operating to produce electrical power.

The present invention couples the fuel cell to the chemical fuel by a system of inlets and outlets which obviate the need for supplying external water to react with the chemical hydride. The fuel cell system of the present invention thereby is lighter in weight and smaller in volume by the amount of water that is not needed, which for sodium borohydride, amounts to a weight and volume savings of approximately two thirds. This is clearly advantageous for portable applications. The specific energy density based on the hydrogen content of sodium borohydride alone (without including the volume or weight of reactant water) is approximately 6300 Watt-hours per liter and 5900 Watt-hours per kilogram. Other chemical hydrides would provide even higher energy densities if used in accordance with the present invention.

Fuels

Several suitable inorganic chemical hydrides react with water in a balanced manner to benefit this invention and give hydrogen, and examples of such reactions are given below.

$$NaBH_4+4H_2O \Rightarrow 4H_2+NaOH.B(OH)_3$$

$$NaBH_4+4H_2O \Rightarrow 4H_2+NaBO_2.2H_2O$$

$$CaH_2+2H_2O \Rightarrow 2H_2+Ca(OH)_2$$

$$LiBH_4+4H_2O \Rightarrow 4H_2+LiOH.B(OH)_3$$

$$LiAlH_4+4H_2O \Rightarrow 4H_2+LiOH.Al(OH)_3$$

These are examples of suitable fuels for beneficial use in the present invention. Their selection will also depend upon factors including their specific energy density, rate of reaction with water vapor, completeness of reaction with water vapor, temperature, etc. Substantially higher specific energy densities are available by using a Li-based hydride such as $LiBH_4$, which has an energy density of approximately 10,000 Watt-hours per liter and per kilogram. If used in the present invention, this specific energy is much higher than popular fuels for fuel cells such as methanol and relatively heavy metal hydrides which adsorb and desorb hydrogen gas as opposed to chemical hydride fuels used in the present invention which react with water to produce hydrogen gas.

Advantageous embodiments of the present invention would include means to utilize as much of the chemical hydride fuel as possible by the fuel cell supplied water vapor. The water supplied from the fuel cell to the chemical hydride, if in a vaporized state, would assist penetration into a solid chemical hydride mass to achieve a more uniform extent of reaction of the available solid chemical hydride (high utilization) than if the water were in a liquid state. In particular, water as vapor, reduces the onset of vapor-pathway blockage of the solid chemical hydride particulate mass, which would otherwise reduce system energy density by precluding further water access to the inner particles of chemical hydride.

Mixing of the particles of chemical hydride with inert material that promotes ingress and penetration by water vapor may be advantageous. Judicious choice of chemical hydride particle size and particle size distribution may also be advantageous to high utilization. Increasing the porosity of the chemical hydride fuel towards water vapor could be achieved by making the chemical hydride into a sheet or wafer form and stacking the sheets or wafers one atop another with an air space therebetween to allow easy ingress of water vapor to facilitate a higher degree and uniformity of reaction of the chemical hydride. The rate of reaction of the solid chemical hydride fuel may be raised by including additives in the chemical hydride such as a catalyst for the reaction including addition of ruthenium or acid-containing compounds.

The addition of a fusible polymer to the chemical hydride particles may be beneficial for safety by selecting a polymer which would melt and spread over the remaining chemical hydride fuel if the temperature rose to an unacceptable level, which would present a barrier to further reaction with incoming water vapor thereby reducing the rate of reaction of the water vapor with the chemical hydride fuel.

While it is anticipated that the principal source of hydrogen is by reaction of the hydrogen-containing fuel with water, as this fuel becomes progressively so reacted, the rate of production of hydrogen may diminish and the fuel cell may require a supplemental hydrogen supply to maintain undiminished power output.

Water Management and Disposal

All fuel cells producing electrical energy from hydrogen and oxygen generate water which at ambient temperature can condense and accumulate at their electrodes and so reduce electrode performance by obstructing the flow of reactant gas to the catalytic surfaces of the electrode. This is commonly prevented by increasing airflow to displace the water. The present invention removes water vapor without having to increase airflow and internally reduces water condensate formation by acting as a 'drying' agent in close proximity to the fuel cell. This is especially advantageous in fuel cell applications near to people and equipment, which are susceptible to build up of moisture.

The present invention anticipates the removal of both the spent chemical hydride fuel (fuel reaction product) with chemically reacted water by mechanical means. Removal of the fuel container 2 in FIG. 1 and replacement by a container with unreacted chemical hydride can be designed to be simple and efficient. Disposal of the spent sodium borohydride which may contain solid borax is not anticipated to be problematic for this invention.

While the preferred embodiments of the present invention have been described with reference to mixed-gas fuel cells, it is understood that the invention is not so limited and can be carried out using generally any type of fuel cell that consumes hydrogen and produces water as a reaction product. For example, the present invention can be practiced using fuel cells that require different electrochemical reactants or different electrochemical reactant concentrations at the cathode and anode electrodes provided that the fuel cells consume hydrogen and produce water as a reaction product.

While the present invention has been described with reference to presently preferred embodiments thereof, other embodiments as well as obvious variations and modifications to all the embodiments will be readily apparent to those of ordinary skill in the art. The present invention is intended to cover all such embodiments, variations and modifications that fall within the spirit and scope of the appended claims.

What is claimed is:

1. A fuel cell system for producing direct-current electrical energy, comprising: an enclosure having an oxygen inlet, a hydrogen inlet and a water outlet; a mixed-gas fuel cell disposed within the enclosure for electrochemically combining oxygen gas introduced through the oxygen inlet with hydrogen gas introduced through the hydrogen inlet to produce direct-current electrical energy and water as a reaction product; a hydrogen-containing fuel in communication with the water outlet for receiving the water and any unreacted gases exiting the enclosure and reacting with the water to produce hydrogen gas; and a passage for directing the hydrogen gas produced by the hydrogen-containing fuel and any unreacted gases mixed therewith through the hydrogen inlet into the enclosure wherein the hydrogen gas mixes with the oxygen gas to produce a hydrogen-lean mixed-gas fuel to sustain operation of the fuel cell.

2. A fuel cell system according to claim 1; further including a fuel container containing therein the hydrogen-containing fuel, the fuel container having an inlet in communication with the water outlet and an outlet in communication with the passage.

3. A fuel cell system according to claim 2; wherein the fuel container is removable from the fuel cell system and replaceable with another fuel container containing hydrogen-containing fuel.

4. A fuel cell system according to claim 3; wherein the fuel container is removably connected to the enclosure.

5. A fuel cell system according to claim 2; further including another passage interconnecting the water outlet of the enclosure with the inlet of the fuel container.

6. A fuel cell system according to claim 5; further including a venting valve disposed along the other passage.

7. A fuel cell system according to claim 6; further including an inlet valve for controlling the introduction of oxygen gas through the oxygen inlet.

8. A fuel cell system according to claim 5; wherein the other passage, in the region where it connects to the inlet of the fuel container, is free of any obstruction that would restrict or impede the free flow of water through the inlet into the fuel container.

9. A fuel cell system according to claim 1; further including an inlet valve for controlling the introduction of oxygen gas through the oxygen inlet.

10. A fuel cell system according to claim 1; wherein the hydrogen-containing fuel is a chemical hydride.

11. A fuel cell system according to claim 10; wherein the chemical hydride is selected from the group consisting of $NaBH_4$, $CaH_2$, $LiBH_4$ and $LiAlH_4$.

12. A fuel cell system according to claim 1; wherein the fuel cell comprises a thin film fuel cell.

13. A fuel cell system according to claim 1; wherein the hydrogen-containing fuel includes one or more additives to raise or lower the rate of reaction of the hydrogen-containing fuel with water.

14. A fuel cell system according to claim 13; wherein one of the additives absorbs heat.

15. A fuel cell system according to claim 13; wherein one of the additives is a fusible polymer.

16. A fuel cell system according to claim 1; wherein the hydrogen-containing fuel is a solid hydrogen-containing fuel.

17. A fuel cell system according to claim 1; wherein the hydrogen-containing fuel is a solid hydrogen-containing fuel that reacts with the water to produce hydrogen gas and a solid spent fuel reaction product.

18. A fuel cell system according to claim 17; wherein the solid hydrogen-containing fuel is comprised of solid particles.

19. A fuel cell system according to claim 18; wherein the solid particles are compacted into sheets.

20. A fuel cell system according to claim 19; wherein the sheets are stacked one atop another with a space between adjacent sheets.

21. A fuel cell system according to claim 18; wherein the solid particles are mixed with an inert material.

22. A fuel cell system according to claim 1; wherein the solid hydrogen-containing fuel is selected to produce a solid spent fuel reaction product that acts as a drying agent effective to reduce formation of water condensate.

23. A fuel cell system according to claim 1; wherein the water outlet communicates directly with the hydrogen-containing fuel so that the water exiting the enclosure passes directly to the hydrogen-containing fuel.

24. A fuel cell system according to claim 1; wherein the water exiting the enclosure passes directly to the hydrogen-containing fuel without separation of the water from any other components exiting the enclosure.

25. A fuel cell system according to claim 1; wherein the water produced by operating the fuel cell is primarily in the form of water vapor; and the hydrogen-containing fuel reacts with the water vapor to produce hydrogen gas.

26. A fuel cell system for producing direct-current electrical energy, comprising: an enclosure having an oxygen inlet; a fuel cell disposed within the enclosure for electrochemically combining oxygen gas introduced through the oxygen inlet mixed with hydrogen gas to produce direct-current electrical energy and water as a reaction product; and a fuel container containing a hydrogen-containing fuel that reacts with water to produce hydrogen gas; wherein the enclosure and the fuel container each have one or more openings, the one or more openings of the enclosure communicating directly with the one or more openings of the fuel container to pass water from the enclosure directly to the fuel container and to pass hydrogen gas from the fuel container directly to the enclosure to produce a hydrogen-lean mixed-gas fuel within the enclosure to sustain operation of the fuel cell.

27. A fuel cell system according to claim 26; wherein the fuel container is removably connected to the enclosure to enable removal of a spent fuel container and replacement thereof with a fresh fuel container.

28. A fuel cell system for producing direct-current electrical energy, comprising: an enclosure having an oxygen inlet, a hydrogen inlet and a water outlet; a mixed-gas fuel cell disposed within the enclosure for electrochemically combining oxygen gas introduced through the oxygen inlet with hydrogen gas introduced through the hydrogen inlet to produce direct-current electrical energy and water as a reaction product; a fuel container having an inlet connected to the water outlet for admitting the water and any unreacted gases exiting the enclosure into the fuel container; a hydrogen-containing fuel disposed in the fuel container for reacting with the water to produce hydrogen gas; and a passage connecting an outlet of the fuel container to the hydrogen inlet for directing the hydrogen gas and any unreacted gases exiting the fuel container into the enclosure wherein the hydrogen gas mixes with the oxygen gas to produce a hydrogen-lean mixed-gas fuel to sustain operation of the fuel cell.

* * * * *